(12) United States Patent
Kono (10) Patent No.: US 10,845,914 B2
(45) Date of Patent: Nov. 24, 2020

(54) ELECTRONIC DEVICE

(71) Applicant: KYOCERA Corporation, Kyoto (JP)

(72) Inventor: Kenji Kono, Yokohama (JP)

(73) Assignee: KYOCERA Corporation, Kyoto (JP)

( * ) Notice: Subject to any disclaimer, the term of this patent is extended or adjusted under 35 U.S.C. 154(b) by 0 days.

(21) Appl. No.: 15/039,095

(22) PCT Filed: Nov. 26, 2014

(86) PCT No.: PCT/JP2014/005922
§ 371 (c)(1),
(2) Date: May 25, 2016

(87) PCT Pub. No.: WO2015/079687
PCT Pub. Date: Jun. 4, 2015

(65) Prior Publication Data
US 2017/0031497 A1 Feb. 2, 2017

(30) Foreign Application Priority Data

Nov. 28, 2013 (JP) ................................ 2013-246433

(51) Int. Cl.
*G06F 3/0485* (2013.01)
*G06F 3/041* (2006.01)
(Continued)

(52) U.S. Cl.
CPC ............ *G06F 3/0416* (2013.01); *G06F 1/169* (2013.01); *G06F 1/1626* (2013.01); *G06F 3/038* (2013.01);
(Continued)

(58) Field of Classification Search
CPC ........ G06F 3/041; G06F 3/0416; G06F 3/044; G06F 3/045; G06F 3/0485; G06F 3/04883
See application file for complete search history.

(56) References Cited

U.S. PATENT DOCUMENTS 8,378,976 B2 * 2/2013 Chiu .................... G06F 3/04855
345/173
8,712,478 B2 4/2014 Inami
(Continued)

FOREIGN PATENT DOCUMENTS

JP 2010-108061 A 5/2010
JP 2010-182029 A 8/2010
(Continued)

OTHER PUBLICATIONS

An Office Action; "Notice of Reasons for Rejection," issued by the Japanese Patent Office dated Sep. 20, 2016, which corresponds to Japanese Patent Application No. 2013-246433 and is related to U.S. Appl. No. 15/039,095; with English language statement of relevance.
(Continued)

*Primary Examiner* — Alexander Eisen
*Assistant Examiner* — Cory A Almeida
(74) *Attorney, Agent, or Firm* — Studebaker & Brackett PC (57) ABSTRACT

An electronic device (1) includes touch sensors (12, 13) on the front surface and on the back surface and a controller that slides the currently displayed screen, upon detecting performance of a slide operation on the touch sensor (13) on the back surface, by sliding the screen in only the direction of the larger vector component between the longitudinal component and the lateral component of the vector of the slide operation.

15 Claims, 9 Drawing Sheets

(51) Int. Cl.
*G06F 3/0354* (2013.01)
*G06F 1/16* (2006.01)
*G06F 3/038* (2013.01)
*G06F 3/044* (2006.01)
*G06F 3/045* (2006.01)
*G06F 3/0488* (2013.01)

(52) U.S. Cl.
CPC .......... *G06F 3/03547* (2013.01); *G06F 3/044* (2013.01); *G06F 3/045* (2013.01); *G06F 3/0485* (2013.01); *G06F 3/04883* (2013.01); *G06F 2203/04105* (2013.01)

(56) References Cited

U.S. PATENT DOCUMENTS

| | | | |
|---|---|---|---|
| 8,866,776 B2 | 10/2014 | Yamanaka et al. | |
| 2001/0041599 A1* | 11/2001 | Pirkola | G06F 3/04886 455/566 |
| 2007/0080931 A1* | 4/2007 | Chen | G06F 3/0219 345/156 |
| 2010/0088632 A1* | 4/2010 | Knowles | G06F 3/0485 715/784 |
| 2012/0242594 A1* | 9/2012 | Matsumoto | G06F 3/0488 345/173 |
| 2012/0276958 A1* | 11/2012 | Inami | H04M 1/0237 455/566 |
| 2013/0007653 A1* | 1/2013 | Stolyarov | G06F 1/1626 715/784 |
| 2013/0057487 A1 | 3/2013 | Yamanaka et al. | |
| 2013/0093709 A1* | 4/2013 | Fujibayashi | G06F 3/04847 345/173 |
| 2013/0106744 A1* | 5/2013 | Asakura | G06F 3/04883 345/173 |

FOREIGN PATENT DOCUMENTS

| | | |
|---|---|---|
| JP | 2011-070554 A | 4/2011 |
| JP | 2012-230567 A | 11/2012 |
| JP | 2013-054467 A | 3/2013 |
| JP | 2013-092942 A | 5/2013 |

OTHER PUBLICATIONS

International Search Report of PCT/JP2014/005922 dated Jan. 6, 2015.
Written Opinion with Concise Explanation of PCT/JP2014/005922 dated Jan. 6, 2015.

* cited by examiner

ELECTRONIC DEVICE

CROSS-REFERENCE TO RELATED APPLICATION

This application claims priority to and the benefit of Japanese Patent Application No. 2013-246433 filed Nov. 28, 2013, the entire contents of which are incorporated herein by reference.

TECHNICAL FIELD

This disclosure relates to an electronic device that includes a touch sensor on the front surface and on the back surface thereof.

BACKGROUND

In recent years, more and more electronic devices, such as mobile phones, are provided with a touch sensor that detects contact by a user. There are many known systems for detecting contact, such as a resistive film system and a capacitive system. All of these systems detect contact by a contacting object such as the user's finger or a stylus pen.

There are also electronic devices that, in addition to the front surface, also include a touch sensor on the back surface. For example, JP 2012-230567 A (PTL 1) discloses a mobile terminal that includes two touch sensors, one on the front surface and one on the back surface, and that based on a predetermined correspondence relationship associated with the usage state, accepts input to a first back surface or a second back surface as input to a first front surface or a second front surface, thereby increasing user-friendliness.

CITATION LIST

Patent Literature

PTL 1: JP 2012-230567 A

SUMMARY

Technical Problem

When operating an electronic device that includes a touch sensor on the back surface with one hand, the user operates the touch sensor on the back surface with the index finger, which is the easiest finger to use, while holding the side and the back surface of the electronic device with the other four fingers and the palm of the hand. In this case, one possible configuration is to slide (scroll) a currently displayed screen by, for example, a slide operation to run the index finger over the touch sensor on the back surface.

With the above-described configuration, however, the range (direction) over which the index finger easily moves is diagonal relative to the housing of the electronic device. Therefore, for example on a browser screen, even though the user intends to scroll the screen longitudinally, the slide operation might be input to the touch sensor on the back surface diagonally, causing the screen to move diagonally instead of longitudinally. Unfortunately, agile movements are thus required for the slide operation.

It would therefore be helpful to provide an electronic device that easily allows a currently displayed screen to be scrolled longitudinally or laterally by a slide operation on the touch sensor on the back surface.

Solution to Problem

In order to resolve the aforementioned problem, an electronic device according to this disclosure includes a touch sensor on a front surface and a touch sensor on a back surface; and a controller configured to slide a currently displayed screen, upon detecting performance of a slide operation on the touch sensor on the back surface, by sliding the screen in only a direction of a larger vector component between a longitudinal component and a lateral component of a vector of the slide operation.

In the electronic device according to this disclosure, the controller may use all of the vector of the slide operation on the touch sensor on the back surface as an amount of displacement of the screen that the controller slides.

Advantageous Effect

According to this disclosure, a currently displayed screen can easily be scrolled longitudinally or laterally by a slide operation on the touch sensor on the back surface.

DETAILED DESCRIPTION

The following describes embodiments in detail with reference to the drawings.

Embodiment 1

Figure 1:
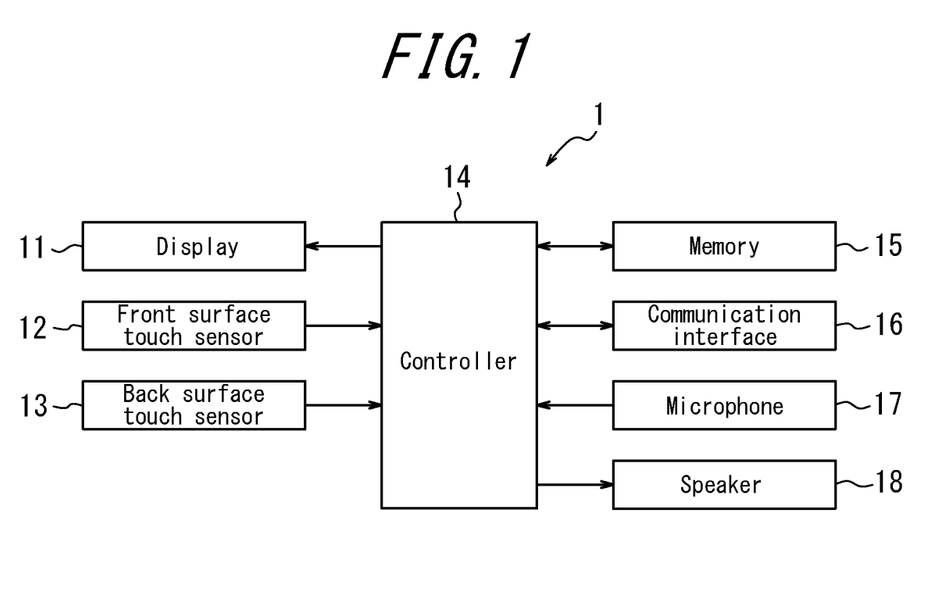
FIG. 1 is a block diagram schematically illustrating the structure of an electronic device according to Embodiment 1.

FIG. 1 is a block diagram schematically illustrating the structure of an electronic device according to Embodiment 1. In the example illustrated in FIG. 1, an electronic device 1 includes a display 11, a front surface touch sensor 12, a back surface touch sensor 13, a controller 14, a memory 15, a communication interface 16, a microphone 17, and a speaker 18.

The display 11 displays images of characters, photographs, objects for operation, browser screens, and the like. The display 11 may be configured using a Liquid Crystal Display (LCD), an Organic Electroluminescence Display (OELD), or the like. For example, on a home screen, the display 11 displays objects for performing operations for a telephone call, e-mail, Internet communication, taking a photograph, and the like. The display 11 can also display a portion of a screen that does not entirely fit on the display 11, such as the screen of a site displayed in a browser screen, so as to allow the screen to be freely slid (scrolled) longitudinally, laterally, and diagonally.

The front surface touch sensor 12 detects contact or release of contact by a finger on an input face of the front surface touch sensor 12. The front surface touch sensor 12 detects the contact position on the input face and outputs a signal indicating the detected contact position to the controller 14. The front surface touch sensor 12 is configured with a transparent member and disposed in overlap on the front surface of the display 11. The user visually confirms images on the display 11 through the transparent front surface touch sensor 12 and causes the electronic device 1 to execute predetermined processing by operating the front surface touch sensor 12 at the display position of an object for operation displayed by the display 11.

The back surface touch sensor 13 is disposed on the back surface of the electronic device 1, in order to improve operability when operating the electronic device 1 with one hand, and detects contact or release of contact by a finger on an input face of the back surface touch sensor 13. The back surface touch sensor 13 also detects the contact position on the input face and outputs a signal indicating the detected contact position to the controller 14.

The front surface touch sensor 12 and the back surface touch sensor 13 may, for example, be implemented with a known system such as a resistive film system or a capacitive system.

Upon detecting an operation on the front surface touch sensor 12 by a signal input from the front surface touch sensor 12, the controller 14 performs control in accordance with the operation. For example, upon the front surface touch sensor 12 being operated at the display position of an object for operation displayed on the display 11, the controller 14 performs control in accordance with the object for operation displayed at the contact position.

Upon detecting an operation on the back surface touch sensor 13 by a signal input from the back surface touch sensor 13, the controller 14 performs control in accordance with the operation. For example, upon detecting that a slide operation was performed on the back surface touch sensor 13 by a signal input from the back surface touch sensor 13, the controller 14 performs control to compare the magnitudes of the longitudinal and lateral components of the vector of the slide operation and to slide the screen currently displayed on the display 11 in only the direction of the larger vector component. At this time, the controller 14 does not use the larger vector component of the slide operation performed on the back surface touch sensor 13 as the amount of displacement (amount of sliding) of the screen that is slid, but rather uses all of the vector of the slide operation.

An operation on the touch sensors 12 and 13 as referred to here includes all operations to contact the finger(s) to the touch sensors 12 and 13, including a touch, tap, double tap, slide, drag, flick, touch and hold, pinch in/out, and the like. A touch is an operation to press with the finger. A tap is an operation to lightly touch with the finger. A double tap is an operation to tap twice in a row. A slide is an operation to run a finger over the touch sensor 12 or 13 from one position to another. A drag is an operation to run a finger over the touch sensor 12 or 13 and then release the finger. A flick is an operation to lightly and quickly touch the touch sensor 12 or 13. A touch and hold is an operation to maintain a touch. A pinch in/out is an operation to pinch two fingers together or spread them apart.

The memory 15 may be configured with a semiconductor memory or the like. The memory 15 stores a variety of information, programs for causing the electronic device 1 to operate, and the like and also functions as a working memory.

The communication interface 16 allows wireless communication with a base station or other communication device.

The microphone 17 picks up surrounding sound, such as speech by the user. The sound picked up by the microphone 17 is converted to an electric signal and transmitted to the controller 14.

The speaker 18 outputs sounds such as voice, music, and a ringtone.

Figure 2A:
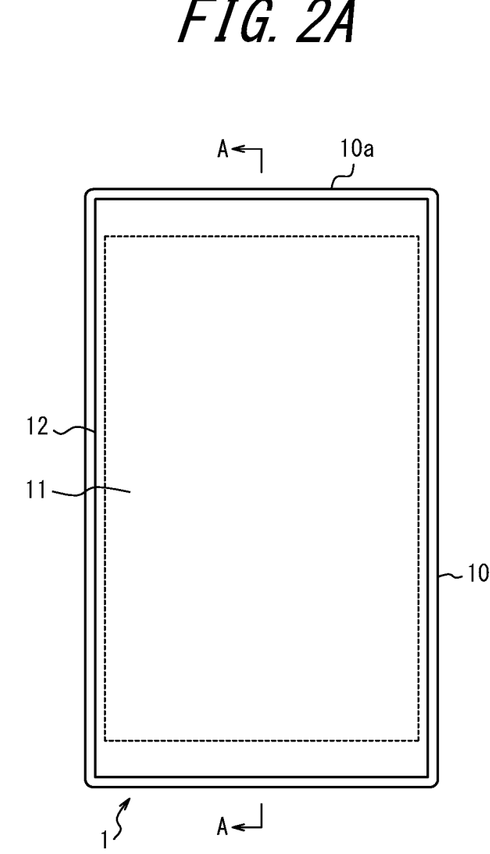
FIGS. 2A, 2B, and 2C illustrate an example of a mounting structure of the electronic device according to Embodiment 1.
Figures 2B, 2C:
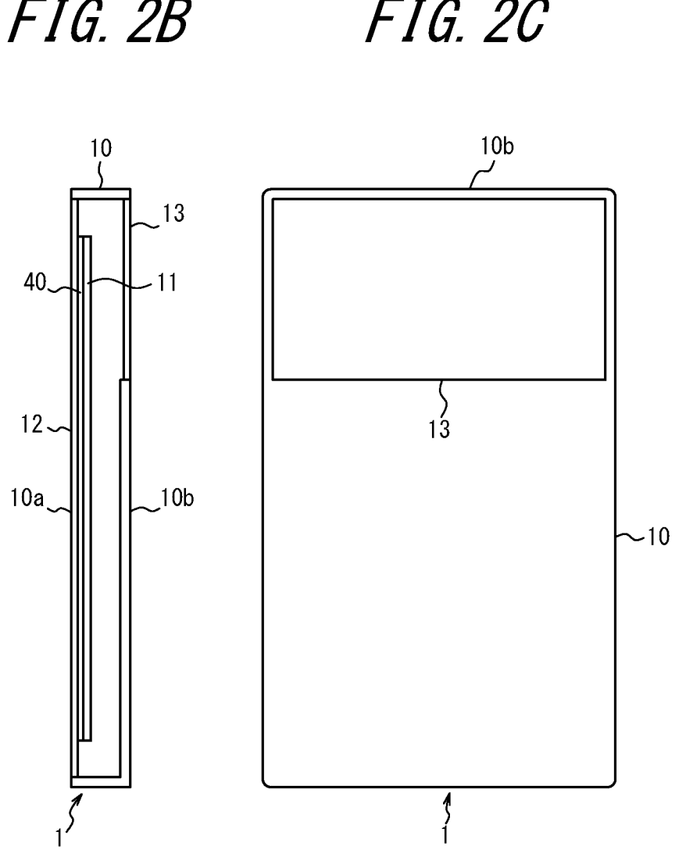

FIGS. 2A, 2B, and 2C illustrate an example of a mounting structure of the electronic device 1 according to Embodiment 1. FIG. 2A is a front view, FIG. 2B is a cross-sectional view along the A-A line in FIG. 2A, and FIG. 2C is a back view.

In FIGS. 2A to 2C, illustration of constituent elements other than a housing 10, the display 11, the front surface touch sensor 12, the back surface touch sensor 13, and a joining member 40 is omitted. Apart from the constituent elements illustrated in FIGS. 2A to 2C, the electronic device 1 includes the controller 14 and may, for example, include elements such as a substrate and a variety of components. Typically, the microphone 17 is disposed at the bottom of the front surface touch sensor 12, and the speaker 18 is disposed at the top of the front surface touch sensor 12.

As illustrated in FIGS. 2A to 2C, the front surface touch sensor 12 is disposed on a front surface 10a of the housing 10 (which for example is a metal or resin case) and is supported by the housing 10.

The display 11 is disposed inside the housing 10. For example, the display 11 may be adhered to the back side of the front surface touch sensor 12 and directly secured to the inside of the housing 10 or secured to a substrate, a display holder, or the like disposed inside the housing 10. In FIGS. 2A to 2C, the display 11 is adhered to the front surface touch sensor 12 with the joining member 40 therebetween. As illustrated in FIG. 2B, if the display 11 is disposed on the back side of the front surface touch sensor 12, then when the front surface touch sensor 12 and the display 11 constitute a touch panel, a user interface can freely be displayed on the display 11 and user operation can be detected by the front surface touch sensor 12. Note that the joining member 40 may be thermosetting or ultraviolet curable adhesive, double-sided tape, or the like. The joining member 40 may, for example, be optical elasticity resin, which is clear and colorless acrylic ultraviolet curing adhesive.

The back surface touch sensor 13 is disposed on a back surface 10b of the housing 10 so as to include a range that can be contacted by the index finger when the electronic device 1 is held in one hand, and the back surface touch sensor 13 is supported by the housing 10. For example, as illustrated in FIGS. 2B and 2C, the back surface touch sensor 13 is disposed on the upper portion of the back surface 10b of the housing 10.

Figure 3A:
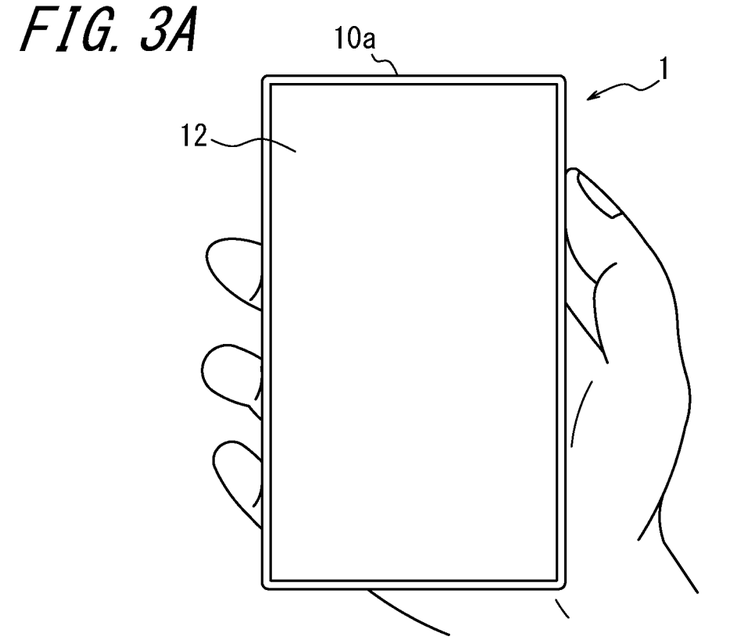
FIGS. 3A and 3B illustrate the user holding the electronic device in the right hand.
Figure 3B:
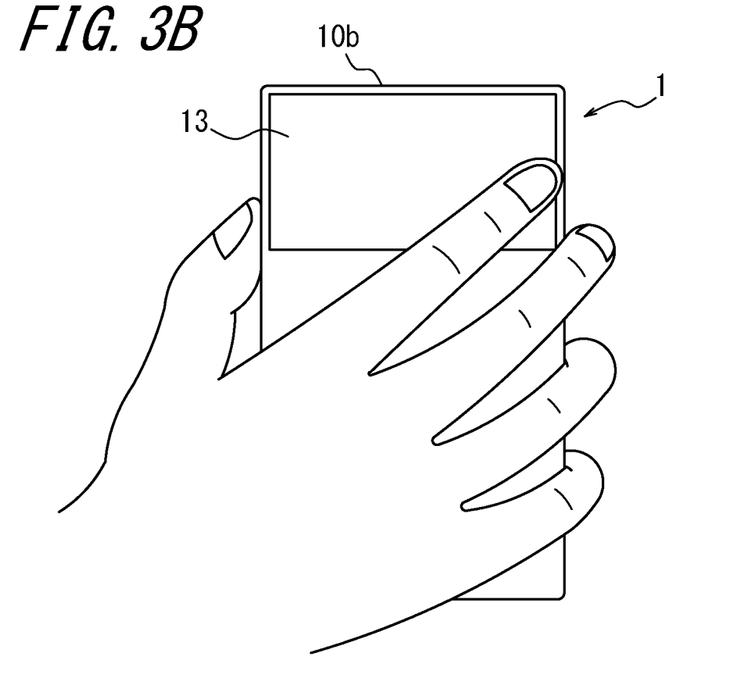

FIGS. 3A and 3B illustrate the user holding the electronic device 1 in the right hand. FIG. 3A is a view from the front surface, and FIG. 3B is a view from the back surface. As illustrated in FIG. 3B, when the electronic device 1 is held in the right hand, the index finger is positioned on the back surface touch sensor 13. Accordingly, by simply bending or moving the index finger left and right, the user can easily operate (touch, tap, double tap, drag, flick, touch and hold, and the like) the back surface touch sensor 13 without moving the other fingers. In this embodiment, the back surface touch sensor 13 is limited to being disposed at a position that can be contacted by the index finger, but the back surface touch sensor 13 may be disposed over a wider area.

Figure 4:
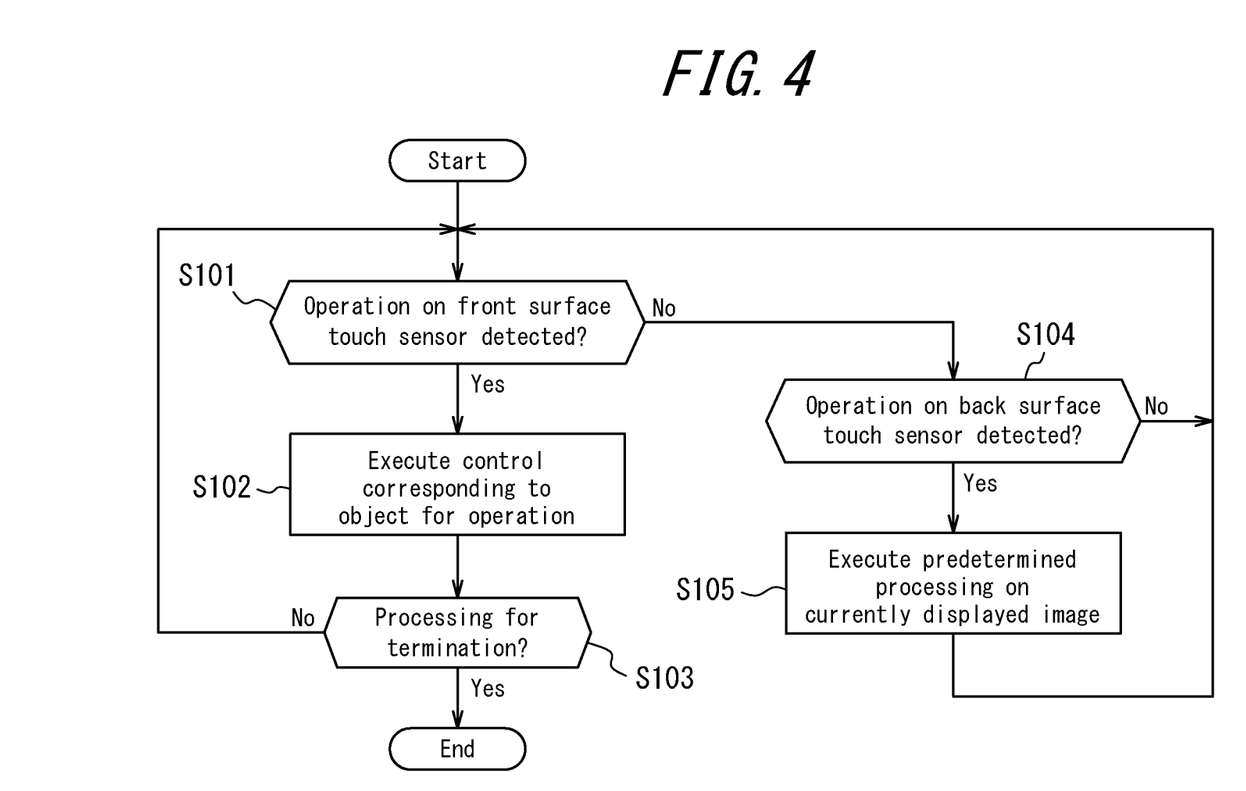
FIG. 4 is a flowchart illustrating processing by the electronic device according to Embodiment 1.

Next, processing by the electronic device 1 according to one of the embodiments of this disclosure is described. FIG. 4 is a flowchart illustrating processing by the electronic device 1 according to Embodiment 1.

Upon detecting a predetermined operation on the front surface touch sensor 12 by a signal input from the front surface touch sensor 12 (step S101: Yes), the controller 14 performs control corresponding to the object for operation displayed at the contact position (step S102). For example, when the display 11 is displaying a browser icon for opening an Internet connection, then upon detecting a tap with the front surface touch sensor 12 at the display position of the browser icon, the controller 14 opens an Internet connection with the communication interface 16, accesses a predetermined URL, and causes the acquired site screen to be displayed in the browser screen displayed on the display 11. When the processing in step S102 is processing to terminate the browser of the electronic device 1 (step S103: Yes), the controller 14 terminates processing and for example causes a home screen (standby screen) to be displayed on the display 11.

Upon detecting that an operation was performed on the back surface touch sensor 13 by a signal input from the back surface touch sensor 13 (step S104: Yes), the controller 14 executes predetermined processing on an image currently displayed on the display 11 (step S105). Specific examples of the control in step S105 are described below.

Figure 5A:
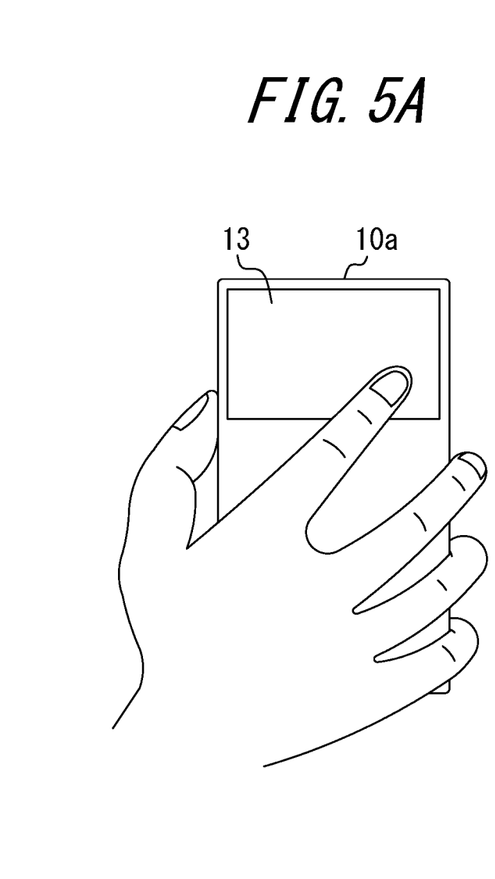
FIGS. 5A, 5B, and 5C illustrate the performance of a slide operation with the index finger on the back surface touch sensor of the electronic device according to Embodiment 1.
Figure 5B:
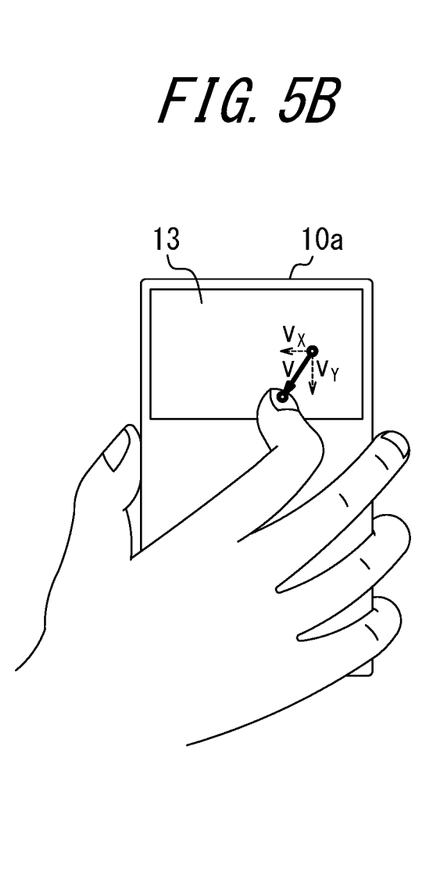
Figure 5C:
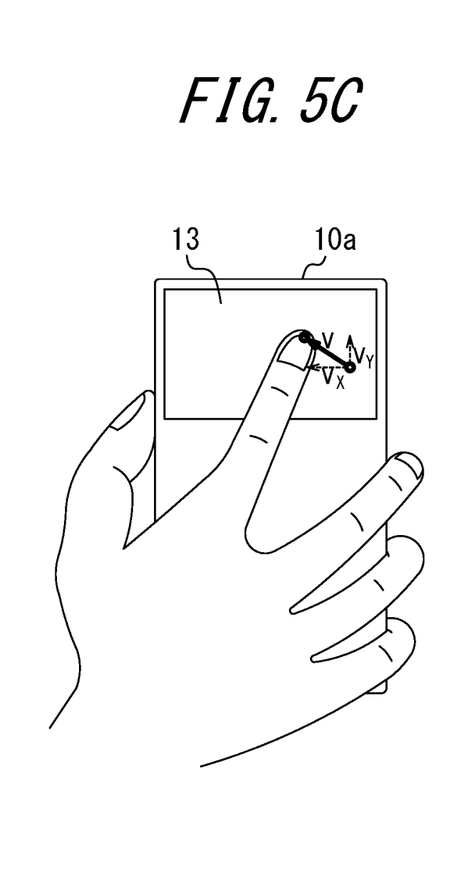

FIGS. 5A, 5B, and 5C illustrate the performance of a slide operation with the index finger on the back surface touch sensor 13 of the electronic device 1.

For example, when the electronic device 1 is connected to the Internet, the display 11 can display a portion of the screen of the site opened by the browser. In this case, by performing a slide operation on the back surface touch sensor 13, the user can slide (scroll) the browser screen currently displayed on the display 11 so as to cause a desired portion of the site to be displayed on the display 11.

However, even though the user intends to perform a slide operation longitudinally or laterally on the back surface touch sensor 13 in order to scroll the screen displayed on the display 11 longitudinally or laterally, the slide operation might be input to the back surface touch sensor 13 diagonally, thereby sliding the image diagonally. For example, in order to scroll the browser screen currently displayed on the display 11 downwards, the user may perform a slide operation on the back surface touch sensor 13 longitudinally downwards by pointing the fingertip as illustrated in FIG. 5B from the initial state illustrated in FIG. 5A. In this case, however, the tip of the index finger may move diagonally relative to the longitudinal direction, and the screen may slide diagonally downwards. In order to scroll the browser screen currently displayed on the display 11 laterally, the user may perform a slide operation on the back surface touch sensor 13 laterally by moving the fingertip as illustrated in FIG. 5C from the initial state illustrated in FIG. 5A. In this case, however, the tip of the index finger may move diagonally relative to the lateral direction, and the screen may slide diagonally sideways.

Therefore, in the electronic device 1 according to this disclosure, when a slide operation is performed on the back surface touch sensor 13, the longitudinal and lateral components of the vector of the slide operation are analyzed, and the currently displayed screen is slid only in the direction of the larger vector component. Hence, when the user attempts to scroll the screen currently displayed on the display 11 longitudinally or laterally, the screen can be prevented from sliding in an unintended diagonal direction.

For example, in the case illustrated in FIG. 5B, the longitudinal component $v_y$ of the vector v of the slide operation on the back surface touch sensor 13 is larger than the lateral component $v_x$. Therefore, the controller 14 performs control to slide the screen displayed on the display 11 only longitudinally, thereby scrolling the image longitudinally. In the case illustrated in FIG. 5C, the lateral component $v_x$ of the vector v of the slide operation on the back surface touch sensor 13 is larger than the longitudinal component $v_y$. Therefore, the controller 14 performs control to slide the screen displayed on the display 11 only laterally, thereby scrolling the image laterally. As a result of this control, when the user performs a slide operation on the back surface touch sensor 13 either longitudinally or laterally in order to scroll the screen displayed on the display 11 longitudinally or laterally, the screen can reliably be scrolled longitudinally or laterally even if the direction of the operation is shifted diagonally at a certain angle relative to the longitudinal or lateral direction. Therefore, according to the electronic device 1, a screen currently displayed on the display 11 can easily be scrolled longitudinally or laterally by a slide operation on the back surface touch sensor 13.

As described above, between the longitudinal and lateral components of the vector of the slide operation input to the back surface touch sensor 13, the controller 14 slides (scrolls) the currently displayed screen in only the direction of the larger vector component. As the amount of displacement of the screen that is slid, however, the controller 14 does not use the larger vector component of the slide operation but rather uses all of the vector of the slide operation. For example, in the case illustrated in FIG. 5B, since the longitudinal component $v_y$ is the larger of the longitudinal and lateral components of the vector v of the slide operation, the controller 14 performs control to slide the screen in the longitudinal direction but uses all of the vector v of the slide operation as the amount of displacement of the screen. In the case illustrated in FIG. 5C, since the lateral component $v_x$ is the larger of the longitudinal and lateral components of the vector v of the slide operation, the controller 14 performs control to slide the screen in the lateral direction but uses all of the vector v of the slide operation as the amount of displacement of the screen. By using all of the vector of the slide operation on the back surface touch sensor 13 as the amount of displacement regardless of the slide direction of the screen, the screen can be slid by an amount of displacement corresponding to the amount of the operation (amount of finger displacement) input to the back surface touch sensor 13. Accordingly, the operability of the electronic device 1 can be further improved.

The controller 14 may be configured so that when detecting that the direction of the slide operation input to the back surface touch sensor 13 is inclined at a predetermined angle or greater relative to the longitudinal or lateral direction, i.e. when detecting that the vector component ratio of the slide operation input to the back surface touch sensor 13 is within a predetermined ratio (for example, the larger vector component being 60% or less), the controller 14 slides the screen currently displayed on the display 11 in a diagonal direction corresponding to the slide operation. According to this control, the screen currently displayed on the display 11 can be slid diagonally by an intentionally diagonal slide operation on the back surface touch sensor 13.

Embodiment 2

Figure 6:
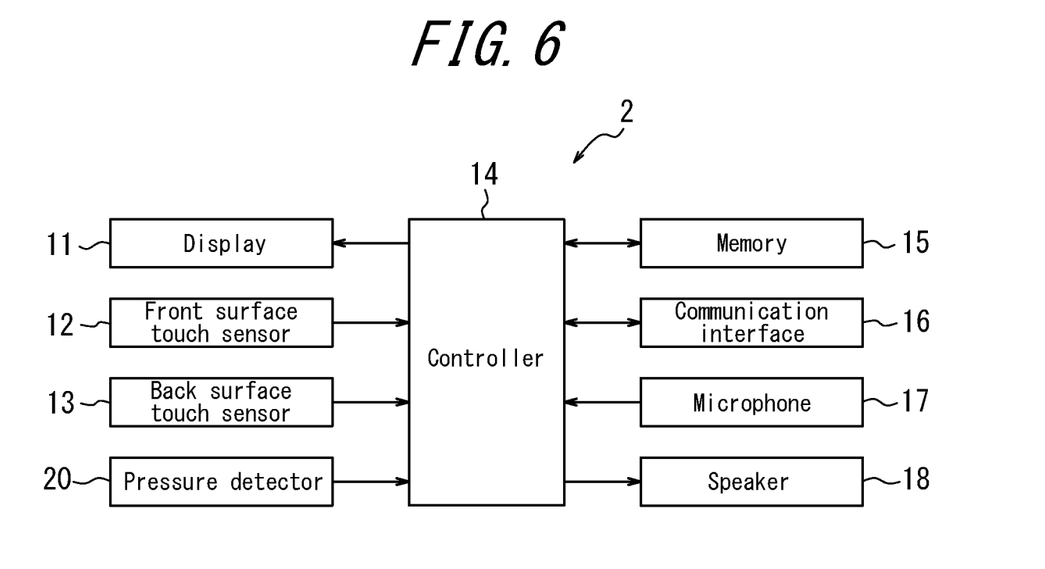
FIG. 6 is a block diagram schematically illustrating the structure of an electronic device according to Embodiment 2.

Next, Embodiment 2 is described. FIG. 6 is a block diagram schematically illustrating the structure of an electronic device according to Embodiment 2. As compared to the electronic device 1 according to Embodiment 1, an electronic device 2 according to Embodiment 2 further includes a pressure detector 20. The remaining structure is identical to that of Embodiment 1. Therefore, the same reference signs are applied, and a description thereof is omitted.

The pressure detector 20 detects pressure when the user performs an operation on the back surface touch sensor 13 and outputs data based on the pressure to the controller 14. The pressure detector 20 for example may be configured using a strain gauge sensor, a piezoelectric element, or the like that experiences a change in physical or electrical characteristics (strain, resistance, voltage, or the like) in response to pressure. When the pressure detector 20 is configured using a piezoelectric element, for example, the voltage value (data based on pressure), which is an electrical characteristic, of the piezoelectric element of the pressure detector 20 changes in accordance with the magnitude of the load (force) of the pressure on the back surface touch sensor 13 (or the speed at which the magnitude of the load changes (acceleration)). Note that instead of a voltage value, the data based on pressure may be the magnitude of the load, the power, the resistance, or the like due to pressure.

The pressure detector 20 may similarly detect pressure when the user performs an operation on the front surface touch sensor 12.

The controller 14 acquires the data based on pressure on the back surface touch sensor 13 (and the front surface touch sensor 12) from the pressure detector 20. When the data based on pressure satisfies a predetermined standard, such as being at least a predetermined threshold, the controller 14 judges that a predetermined operation has been performed, and in response to the content of the operation, performs control to execute predetermined processing based, for example, on an application. For example, the controller 14 judges that a slide operation on the back surface touch sensor 13 has begun when pressure data on the back surface touch sensor 13 is at least a predetermined threshold and judges that the slide operation on the back surface touch sensor 13 has ended when the pressure data falls below the predetermined threshold.

Furthermore, the pressure detector 20 can be configured in accordance with the contact detection system. For example, if the contact detection system is a resistive film system, the pressure detector 20 may be configured without using a strain gauge sensor, piezoelectric element, or the like by associating the magnitude of the resistance that corresponds to the size of the contact area with the load of the pressure on the touch face of the touch sensor. Alternatively, if the touch sensor uses a capacitive type system, a configuration without a strain gauge sensor, a piezoelectric element, or the like may be adopted by associating the magnitude of the capacitance with the load of the pressure on the touch sensor.

Figure 7A:
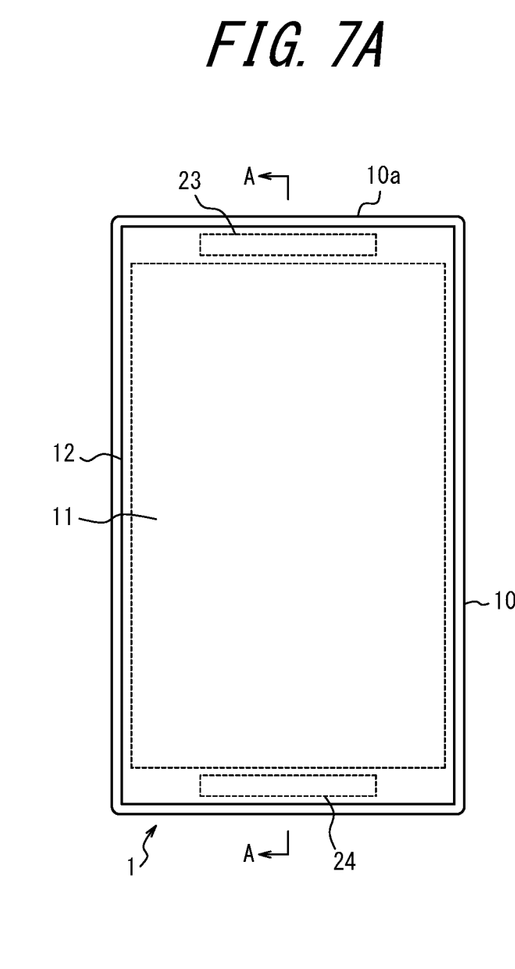
FIGS. 7A, 7B, and 7C illustrate an example of a mounting structure of the electronic device according to Embodiment 2.
Figure 7B:
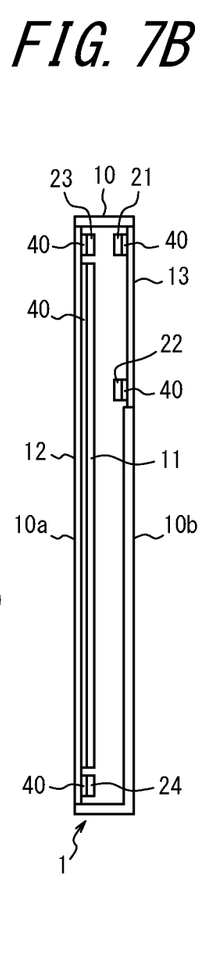
Figure 7C:
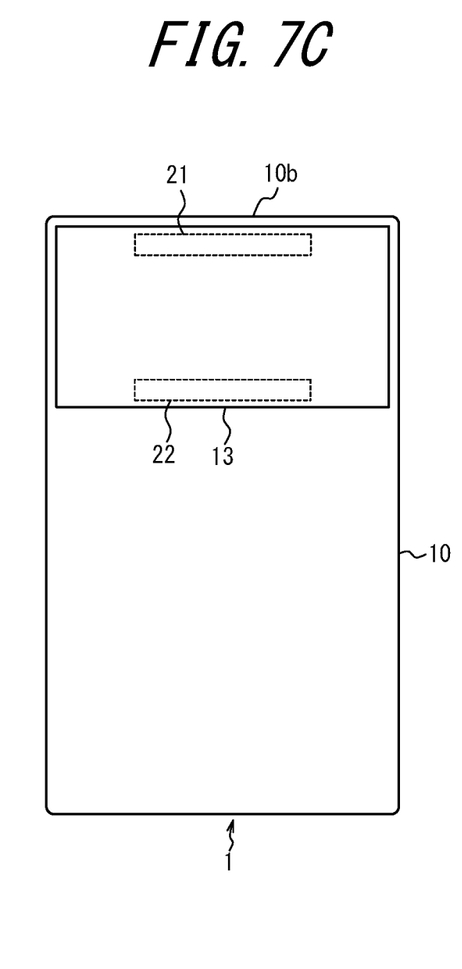

FIGS. 7A, 7B, and 7C illustrate an example of a mounting structure of the electronic device 2 according to Embodiment 2. FIG. 7A is a front view, FIG. 7B is a cross-sectional view along the A-A line in FIG. 7A, and FIG. 7C is a back view. FIGS. 7A to 7C illustrate the mounting structure of the electronic device 1 in FIGS. 2A to 2C with the addition of piezoelectric elements 21 to 24 that form the pressure detector 20. The number and arrangement of the piezoelectric elements is not limited to the illustrated example.

In the example in FIGS. 7A to 7C, the pressure detector 20 includes a first piezoelectric element 21, a second piezoelectric element 22, a third piezoelectric element 23, and a fourth piezoelectric element 24, uses the first piezoelectric element 21 and the second piezoelectric element 22 to detect pressure when the user performs an operation on the back surface touch sensor 13, and uses the third piezoelectric element 23 and the fourth piezoelectric element 24 to detect pressure when the user performs an operation on the front surface touch sensor 12.

In FIG. 7A, in the area on the front surface touch sensor 12 where the display by the display 11 does not need to be visible, i.e. the area where the front surface touch sensor 12 and the display 11 do not overlap, the area near the edges of the front surface touch sensor 12 is preferably painted or covered with a bezel. The third piezoelectric element 13, fourth piezoelectric element 24, and the like can thus be prevented from being seen from the exterior of the electronic device 1.

Figure 8:
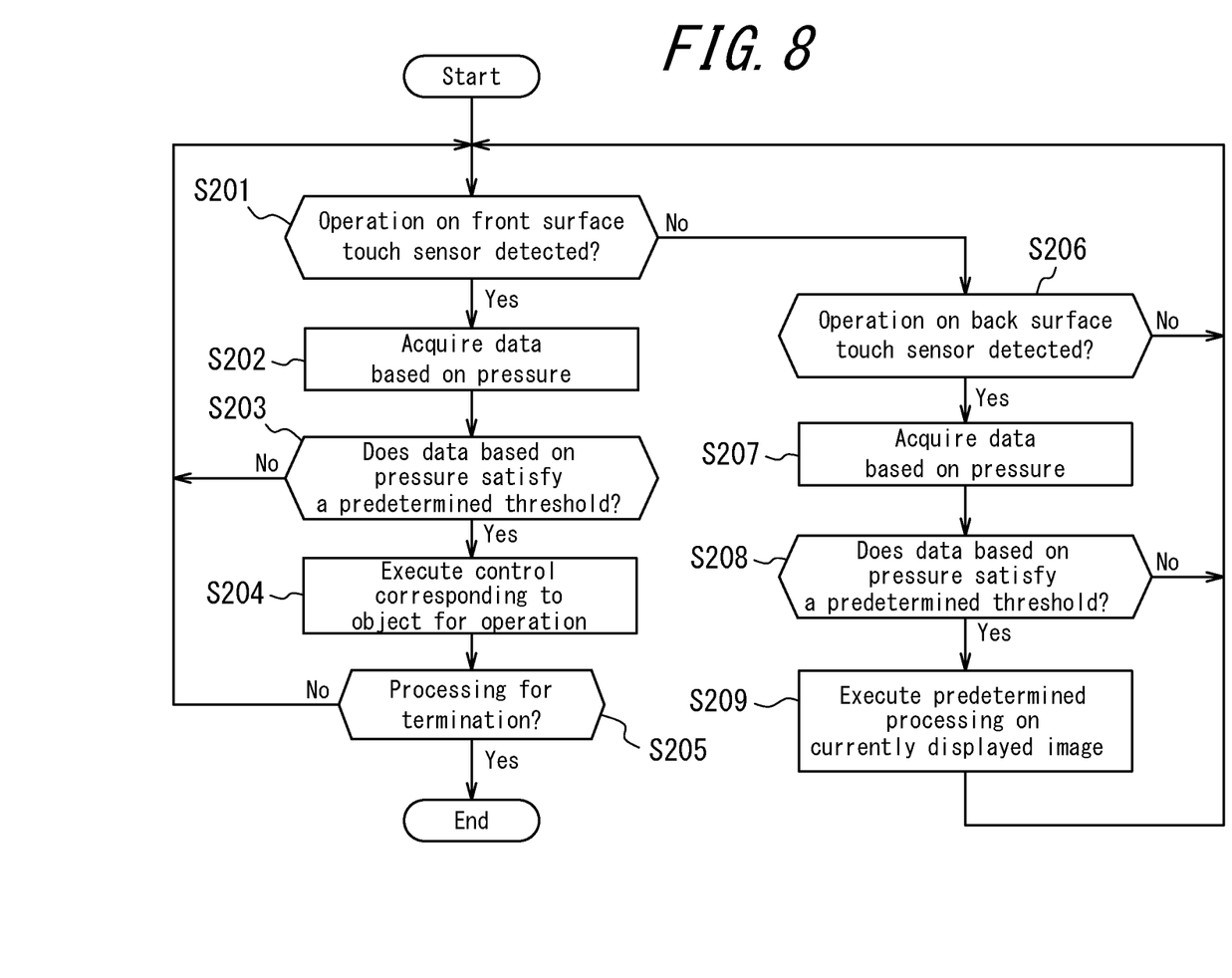
FIG. 8 is a flowchart illustrating processing by the electronic device according to Embodiment 2.

Next, processing by the electronic device 2 according to one of the embodiments of this disclosure is described. FIG. 8 is a flowchart illustrating processing by the electronic device 2 according to Embodiment 2.

Upon detecting a predetermined operation on the front surface touch sensor 12 by a signal input from the front surface touch sensor 12 (step S201: Yes), the controller 14 acquires data based on pressure on the front surface touch sensor 12 from the pressure detector 20 (step S202). The controller 14 then determines whether the acquired data based on pressure satisfies a predetermined threshold (step S203), and when the data based on pressure satisfies a predetermined threshold (step S203: Yes), the controller 14 judges that a pressure operation has been performed on the front surface touch sensor 12 and executes control in accordance with the object for operation displayed at the pressure position (step S204). When the processing in step S204 is processing to close an application, a menu, or the like (step S205: Yes), the controller 14 terminates processing and for example causes a home screen (standby screen) to be displayed on the display 11.

Upon detecting a predetermined operation on the back surface touch sensor 13 by a signal input from the back surface touch sensor 13 (step S206: Yes), the controller 14 acquires data based on pressure on the back surface touch sensor 13 from the pressure detector 20 (step S207). The controller 14 then determines whether the acquired data based on pressure satisfies a predetermined threshold (standard) (step S208), and when the data based on pressure satisfies a predetermined threshold (step S208: Yes), the controller 14 judges that an operation has been performed on the back surface touch sensor 13 and executes predetermined processing corresponding to the image currently displayed on the display 11 (step S209). The predetermined processing is as described in Embodiment 1.

Stating that the data based on pressure satisfies a predetermined threshold may refer to when data based on pressure has reached a predetermined standard value, to when data based on pressure has exceeded a predetermined standard value, or to when data based on pressure equivalent to a predetermined standard value has been detected.

As described above, the electronic device 2 according to Embodiment 2 further includes a pressure detector 20, and when data based on pressure satisfies a predetermined threshold, the controller 14 executes predetermined processing on a currently displayed screen (image) or object. Therefore, a judgement that the user has performed an operation can be prevented when the electronic device 2 has merely contacted another object lightly. In particular, when the user holds the electronic device, the fingers contact the back surface 10b, but by having the pressure detector 20 detect pressure, an incorrect judgement that the user has operated the back surface touch sensor 13 when in fact the user had no intention of doing so can be prevented.

Embodiment 3

Figure 9:
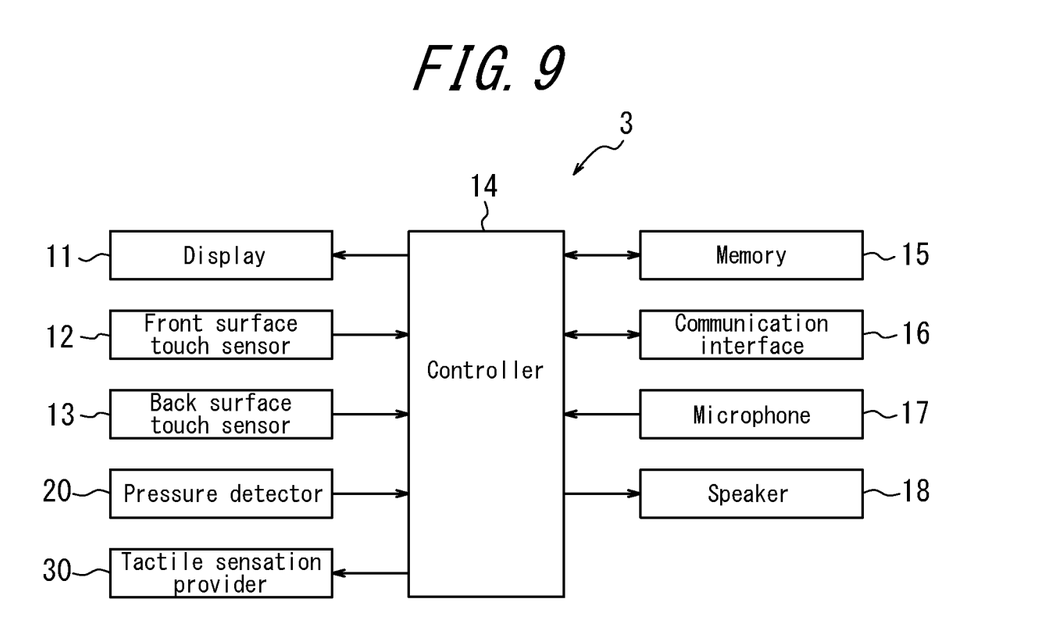
FIG. 9 is a block diagram schematically illustrating the structure of an electronic device according to Embodiment 3.

Next, Embodiment 3 is described. FIG. 9 is a block diagram schematically illustrating the structure of an electronic device according to Embodiment 3. As compared to the electronic device 2 according to Embodiment 2, an electronic device 3 according to Embodiment 3 further includes a tactile sensation provider 30. The remaining structure is identical to that of Embodiment 2. Therefore, the same reference signs are applied, and a description thereof is omitted.

The tactile sensation provider 30 generates a predetermined vibration based on a drive signal provided by the controller 14. It suffices for the drive signal to be a drive signal that expresses vibration, at the position contacted by the finger, corresponding to behavior of a real button that is to be expressed.

The tactile sensation provider 30 is configured using a piezoelectric element, an ultrasonic transducer, a vibration motor (eccentric motor), or the like, and by generating vibration with a predetermined vibration pattern, provides a tactile sensation to the user's finger pressing the back surface touch sensor 13, thereby providing the user with a sensory understanding that the back surface touch sensor 13 has been operated. Without using a mechanical vibration, the tactile sensation provider 30 may provide a tactile sensation to the user's finger pressing the back surface touch sensor 13 for example by controlling the electric charge of a film adhered onto the back surface touch sensor 13.

The tactile sensation provider 30 may also similarly generate vibration for the front surface touch sensor 12 to provide a tactile sensation to the user's finger pressing the front surface touch sensor 12.

The tactile sensation provider 30 may be configured integrally with the pressure detector 20. In particular, when the pressure detector 20 and the tactile sensation provider 30 are both configured using a piezoelectric element, they may be configured to share a common piezoelectric element. The reason is that a piezoelectric element generates voltage when pressure is applied and deforms upon application of voltage. An example of a mounting structure for this case is as illustrated in FIGS. 7A to 7C.

In the case of configuring the pressure detector 20 and the tactile sensation provider 30 with a piezoelectric element, when the voltage value of the piezoelectric element satisfies a predetermined threshold, the controller 14 may execute predetermined processing and generate vibration by driving the piezoelectric element. Stating that the voltage value of the piezoelectric element satisfies a predetermined threshold may refer to when the voltage value has reached a predetermined standard value, to when the voltage value has exceeded a predetermined standard value, or to when a voltage value equivalent to a predetermined standard value has been detected.

As described above, the electronic device 3 according to Embodiment 3 further includes the tactile sensation provider 30 and generates a predetermined vibration based on a drive signal provided by the controller 14. Therefore, when the user operates the back surface touch sensor 13 (and the front surface touch sensor 12), the electronic device 3 can provide the user with a sensory understanding that the intended operation has been performed.

The above embodiments have been described as representative examples, but it will be apparent to one of ordinary skill in the art that numerous modifications and replacements may be made within the spirit and scope of this disclosure. Therefore, this disclosure should not be interpreted as being restricted to the above-described embodiments. A variety of changes and modifications may be made without departing from the scope of the appended claims. For example, a plurality of the structural blocks described in the embodiments may be combined into one, or one structural block may be divided into multiple parts.

REFERENCE SIGNS LIST 1, 2, 3 Electronic device
11 Display
12 Front surface touch sensor
13 Back surface touch sensor
14 Controller
15 Memory
16 Communication interface
17 Microphone
18 Speaker
20 Pressure detector
21 First piezoelectric element
22 Second piezoelectric element
23 Third piezoelectric element
24 Fourth piezoelectric element
30 Tactile sensation provider
40 Joining member

The invention claimed is:
1. An electronic device comprising:
a housing comprising a front surface, a back surface, and a plurality of side surfaces, wherein the front surface is directly connected to the back surface via a portion of each of the plurality of side surfaces;
a touch sensor on the front surface of the housing and a touch sensor on the back surface of the housing;
a display on the front surface of the housing;
a controller configured to slide a currently displayed screen, upon detecting performance of a slide operation on the touch sensor on the back surface; and
a pressure sensor comprising at least one piezoelectric element arranged on the front surface and at least one piezoelectric element arranged on the back surface of the electronic device,
wherein the controller is configured to compare a first magnitude of a longitudinal component of a vector of the slide operation with a second magnitude of a lateral component of the vector of the slide operation to determine a larger vector component of the longitudinal component of the vector and the lateral component of the vector,
wherein the controller is configured to slide the screen in only a direction of the larger vector component when a ratio of the first magnitude and the second magnitude is greater than a predetermined ratio, wherein the controller uses magnitude of the vector of the slide operation as an amount of displacement of the screen that the controller slides, wherein the touch sensor on the back surface is disposed only on an upper portion of the back surface, wherein the touch sensor on the front face of the housing is configured to detect contact or release of contact by a contacting object on an input face of the touch sensor on the front face of the housing, and wherein the touch sensor on the front surface has a greater area than the display.

2. The electronic device of claim 1, wherein the controller uses all of the vector of the slide operation on the touch sensor on the back surface as an amount of displacement of the screen that the controller slides.

3. The electronic device of claim 1, wherein the controller is configured to slide the screen diagonally when the ratio of the first magnitude and the second magnitude is less than or equal to the predetermined ratio.

4. The electronic device of claim 1, wherein the upper portion of the back surface is provided above a longitudinal midpoint of the back surface.

5. The electronic device of claim 1, wherein a distance from a lower edge of the touch sensor on the back surface to an upper edge of the electronic device is less than a distance from the lower edge of the touch sensor to a lower edge of the electronic device.

6. The electronic device of claim 1,
wherein the controller is configured to slide the currently displayed screen on the display on the front surface of the housing, upon detecting performance of the slide operation on the touch sensor on the back surface of the housing.

7. The electronic device of claim 6, wherein the controller is configured to compare the first magnitude of the longitudinal component of the vector of the slide operation on the touch sensor on the back surface of the housing with the second magnitude of the lateral component of the vector of the slide operation on the touch sensor on the back surface of the housing to determine the larger vector component of the longitudinal component of the vector and the lateral component of the vector, wherein the controller is configured to slide the currently displayed screen on the display on the front surface of the housing in only the direction of the larger vector component when the ratio of the first magnitude and the second magnitude is greater than the predetermined ratio, and wherein the controller uses magnitude of the vector of the slide operation on the touch sensor on the back surface of the housing as the amount of displacement of the currently displayed screen on the display on the front surface of the housing that the controller slides.

8. The electronic device of claim 1, wherein the slide operation is a scroll operation, wherein the controller is configured to scroll the currently displayed screen, upon detecting performance of the scroll operation on the touch sensor on the back surface, wherein the controller is configured to compare the first magnitude of the longitudinal component of the vector of the scroll operation with the second magnitude of the lateral component of the vector of the scroll operation to determine the larger vector component of the longitudinal component of the vector and the lateral component of the vector, wherein the controller is configured to scroll the currently displayed screen in only the direction of the larger vector component when the ratio of the first magnitude and the second magnitude is greater than the predetermined ratio, and wherein the controller uses magnitude of the vector of the scroll operation as the amount of displacement of the currently displayed screen that the controller scrolls.

9. The electronic device of claim 8, wherein the currently displayed screen is a browser screen.

10. An electronic device comprising:
a housing comprising a front surface, a back surface, and a plurality of side surfaces, wherein the front surface is directly connected to the back surface via a portion of each of the plurality of side surfaces;
a touch sensor on the front surface of the housing and a touch sensor on the back surface of the housing;
a display on the front surface of the housing;
a controller configured to slide a currently displayed screen, upon detecting performance of a slide operation on the touch sensor on the back surface; and
a pressure sensor comprising at least one piezoelectric element arranged on the front surface and at least one piezoelectric element arranged on the back surface of the electronic device,
wherein the controller is configured to compare a first magnitude of a longitudinal component of a vector of the slide operation with a second magnitude of a lateral component of the vector of the slide operation to determine a larger vector component of the longitudinal component of the vector and the lateral component of the vector,
wherein the controller is configured to slide the screen in only a direction of the larger vector component when a ratio of the first magnitude and the second magnitude is greater than a predetermined ratio,
wherein the controller uses magnitude of the vector of the slide operation as an amount of displacement of the screen that the controller slides,
wherein the slide operation may start at any point on the touch sensor on the back surface,
wherein the touch sensor on the front face of the housing is configured to detect contact or release of contact by a contacting object on an input face of the touch sensor on the front face of the housing, and
wherein the touch sensor on the front surface has a greater area than the display.

11. The electronic device of claim 10, wherein the controller uses the magnitude of the vector of the slide operation performed on the touch sensor on the back surface as an amount of displacement of the screen on the front surface that the controller slides.

12. The electronic device of claim 10,
wherein the controller is configured to slide the currently displayed screen on the display on the front surface of the housing, upon detecting performance of the slide operation on the touch sensor on the back surface of the housing.

13. The electronic device of claim 12, wherein the controller is configured to compare the first magnitude of the longitudinal component of the vector of the slide operation on the touch sensor on the back surface of the housing with the second magnitude of the lateral component of the vector of the slide operation on the touch sensor on the back surface of the housing to determine the larger vector component of the longitudinal component of the vector and the lateral component of the vector,     wherein the controller is configured to slide the currently displayed screen on the display on the front surface of the housing in only the direction of the larger vector component when the ratio of the first magnitude and the second magnitude is greater than the predetermined ratio, and     wherein the controller uses magnitude of the vector of the slide operation on the touch sensor on the back surface of the housing as the amount of displacement of the currently displayed screen on the display on the front surface of the housing that the controller slides.

14. The electronic device of claim 10, wherein the slide operation is a scroll operation,     wherein the controller is configured to scroll the currently displayed screen, upon detecting performance of the scroll operation on the touch sensor on the back surface,     wherein the controller is configured to compare the first magnitude of the longitudinal component of the vector of the scroll operation with the second magnitude of the lateral component of the vector of the scroll operation to determine the larger vector component of the longitudinal component of the vector and the lateral component of the vector,     wherein the controller is configured to scroll the currently displayed screen in only the direction of the larger vector component when the ratio of the first magnitude and the second magnitude is greater than the predetermined ratio, and     wherein the controller uses magnitude of the vector of the scroll operation as the amount of displacement of the currently displayed screen that the controller scrolls.

15. The electronic device of claim 14, wherein the currently displayed screen is a browser screen.

* * * * *